(12) United States Patent
Tani et al.

(10) Patent No.: US 7,758,687 B2
(45) Date of Patent: Jul. 20, 2010

(54) COATING FLUID FOR FORMING FILM, AND FILM THEREOF AND FILM-FORMING PROCESS

(75) Inventors: Yoshihiro Tani, Funabashi (JP); Kenichi Motoyama, Funabashi (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 0 days.

(21) Appl. No.: 12/393,688

(22) Filed: Feb. 26, 2009

(65) Prior Publication Data

US 2009/0162665 A1 Jun. 25, 2009

Related U.S. Application Data

(63) Continuation of application No. 11/449,638, filed on Jun. 9, 2006, now Pat. No. 7,550,040.

(30) Foreign Application Priority Data

Jun. 17, 2005 (JP) ............................. 2005-177434
Jun. 17, 2005 (JP) ............................. 2005-178016

(51) Int. Cl.
*D06M 15/643* (2006.01)
*B32B 9/04* (2006.01)
*B05D 3/02* (2006.01)

(52) U.S. Cl. ............................. 106/287.11; 106/287.1; 427/387; 528/367

(58) Field of Classification Search ................... 524/492
See application file for complete search history.

(56) References Cited

U.S. PATENT DOCUMENTS

| | | | |
|---|---|---|---|
| 4,339,553 A | 7/1982 | Yoshimura et al. | |
| 4,689,085 A | 8/1987 | Plueddemann | |
| 4,879,345 A | 11/1989 | Connelly et al. | |
| 5,316,797 A | 5/1994 | Hazlebeck et al. | |
| 5,639,555 A | 6/1997 | Bishop | |
| 5,766,673 A | 6/1998 | Nogami et al. | |
| 5,800,926 A | 9/1998 | Nogami et al. | |
| 6,207,098 B1 | 3/2001 | Nakanishi et al. | |
| 6,215,011 B1 | 4/2001 | Bishop | |
| 6,218,498 B1 | 4/2001 | Oberneder et al. | |
| 6,472,012 B2 | 10/2002 | Nakada et al. | |
| 6,500,967 B2 | 12/2002 | Hayashi et al. | |
| 6,797,453 B2 | 9/2004 | Shiraki et al. | |
| 7,211,522 B2 | 5/2007 | Motoyama et al. | |
| 7,491,651 B2 | 2/2009 | Motoyama et al. | |
| 7,550,040 B2 * | 6/2009 | Tani et al. ............... | 106/287.11 |
| 2001/0012565 A1 | 8/2001 | Nakada et al. | |
| 2001/0050741 A1 | 12/2001 | Hokazono et al. | |
| 2002/0007751 A1 | 1/2002 | Inoue et al. | |
| 2002/0007767 A1 | 1/2002 | Ogaki et al. | |
| 2002/0197485 A1 | 12/2002 | Nishikawa et al. | |
| 2003/0076596 A1 | 4/2003 | Miyatake et al. | |
| 2003/0099844 A1 | 5/2003 | Hanahata et al. | |
| 2004/0115955 A1 | 6/2004 | Motoyama et al. | |
| 2004/0125169 A1 | 7/2004 | Nakagawa et al. | |
| 2004/0197698 A1 | 10/2004 | Tamaki et al. | |
| 2005/0175927 A1 | 8/2005 | Kishioka et al. | |
| 2006/0189163 A1 | 8/2006 | Motoyama et al. | |
| 2007/0155896 A1 | 7/2007 | Motoyama et al. | |
| 2007/0155897 A1 | 7/2007 | Tani et al. | |

FOREIGN PATENT DOCUMENTS

| | | |
|---|---|---|
| JP | 61-10043 | 1/1986 |
| JP | 5-105424 | 4/1993 |
| JP | 6-157076 | 6/1994 |
| JP | 7-82486 | 3/1995 |
| JP | 9-208898 | 8/1997 |
| JP | 11-124514 | 5/1999 |

* cited by examiner

*Primary Examiner*—Randy Gulakowski
*Assistant Examiner*—Robert Loewe
(74) *Attorney, Agent, or Firm*—Oblon, Spivak, McClelland, Maier & Neustadt, L.L.P.

(57) ABSTRACT

To provide a coating fluid for forming a film, which is curable sufficiently by heat treatment at a low temperature of at most 70° C. to form a cured film excellent in abrasion resistance and which is excellent in storage stability, a film obtained from the coating fluid for forming a film, and a process for forming the film. A coating fluid for forming a film, which comprises a polysiloxane (A) obtained by condensation polymerization of a silicon compound of the formula (1) as the essential component, and a compound (B) of the formula (2):

$$Si(OR^1)_4 \qquad (1)$$

wherein $R^1$ is a $C_{1-5}$ hydrocarbon group,

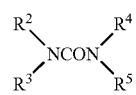

(2)

each of $R^2$, $R^3$, $R^4$ and $R^5$ which are independent of one another, is a hydrogen atom or a $C_{1-12}$ organic group.

14 Claims, No Drawings

COATING FLUID FOR FORMING FILM, AND FILM THEREOF AND FILM-FORMING PROCESS

CROSS-REFERENCE TO RELATED APPLICATIONS

This application is a continuation of application Ser. No. 11/449,638 filed Jun. 9, 2006, which is based on Japanese Priority applications Serial Nos. 2005-177434 and 2005-178016, each filed Jun. 17, 2005.

BACKGROUND OF THE INVENTION

1. Field of the Invention

The present invention relates to a coating field for forming a film, which contains, as the main component, a polysiloxane obtained by condensation polymerization of an alkoxy group-containing silicon compound, such as a coating fluid for forming a film, which is capable of forming a water repellent film, and a film formed from such a coating fluid and a process for forming such a film.

2. Discussion of Background

Heretofore, it has been common to form a protective film on a substrate surface as a method for imparting an abrasion resistance to a plastic substrate made of an acrylic resin, a polyester or a polycarbonate.

As a coating fluid to form such a protective film, a heat curable coating fluid containing, as the main component, a polysiloxane obtained by hydrolytic condensation polymerization of a silicon compound such as a tetraalkoxysilane, has been developed. However, with such a heat curable coating fluid, the heat treating temperature at the time of forming a film is restricted by e.g. the heat resistant temperature of the substrate, whereby there has been a case where the film is not sufficiently cured, and no adequate abrasion resistance can be obtained, and it has been desired to lower the heat treating temperature.

As a method for accomplishing such an object, for example, a method of lowering the temperature for forming a film has been proposed which utilizes a catalytic reaction by adding a curing catalyst such as a metal salt of an organic acid, a tin alkyl ester compound, a tin halide compound, a tin orthoester compound, a metal alcoholate, a titanium chelate compound or a nitrogen-containing basic organic compound (Patent Document 1), or a photocurable coating fluid requiring no heat treatment has been proposed which employs a photocurable resin composition comprising (A) an acrylate of bisphenol A diglycidyl ether polymer, (B) dipentaerythritol monohydroxy pentaacrylate, (C) a photopolymerization initiator, (D) inorganic particles and (E) a terminal reactive polydimethylsiloxane (Patent Document 2).

In recent years, plastic substrates, particularly plastic films, tend to have their thicknesses made thin for the purpose of high transparency, weight reduction, etc., and there has been a problem that they are likely to be damaged by heat. A photocurable coating fluid has been developed, but has been still inadequate. Accordingly, it has been desired more than ever to develop a heat curable coating fluid for forming a film which is sufficiently curable by such a low temperature treatment that a plastic film will receive no damage.

On the other hand, it has been known that if a film showing a refractive index lower than the refractive index of a substrate is formed on the surface of such a substrate, the reflectance of light reflecting from the surface of such a film will decrease. And, the film showing such a decreased light reflectance has been utilized as an antireflection film and has been applied to various substrate surfaces.

A process for forming on a substrate an antireflection film showing a low refractive index, is disclosed wherein an alcohol dispersion of fine $MgF_2$ particles formed by reacting a magnesium salt or an alkoxymagnesium compound as a Mg source with a fluoride as a F source, or a liquid having a tetraalkoxysilane or the like added thereto for improvement of the film strength, is used as a coating fluid, and such a coating fluid is applied on a glass substrate such as a cathode ray tube and subjected to heat treatment at from 100 to 500° C. (Patent Document 3).

A low reflection glass having formed on a glass substrate a thin film showing a refractive index of from 1.21 to 1.40, having micropits or convexoconcaves with diameters of from 50 to 200 nm and having a thickness of from 60 to 160 nm, is disclosed, wherein a coating fluid is prepared by mixing at least two types of hydrolytic condensation polymers of tetraalkoxysilane, methyltrialkoxysilane, ethyltrialkoxysilane, etc. different in the average molecular weight with a solvent such as an alcohol, a film is formed from such a coating fluid by adjusting the mixing ratio in such mixing and by controlling the relative humidity, and then the film is heated (Patent Document 4).

A low reflectance glass is disclosed which comprises a glass, an underlayer film having a high refractive index formed on its surface, and an upper layer film having a low refractive index formed further on its surface (Patent Document 5). In this document, as a method for forming such an upper layer film, a method is disclosed wherein a fluorinated silicon compound having a polyfluorocarbon chain such as $CF_3(CF_2)_2C_2H_4Si(OCH_3)_3$ and from 5 to 90 wt %, based thereon, of silane coupling agent such as $Si(OCH_3)_4$ are hydrolyzed in an alcohol solvent in the presence of a catalyst such as acetic acid at room temperature, followed by filtration to prepare a liquid of a co-condensate, and then, such a liquid is applied on the above-mentioned underlayer film and heated at from 120 to 250° C.

It is disclosed that a reaction mixture comprising a silicon compound represented by $Si(OR)_4$, a silicon compound represented by $CF_3(CF_2)_nCH_2CH_2Si(OR^1)_3$, an alcohol represented by $R^2CH_2OH$ and oxalic acid in a specific ratio, is heated in the absence of water at from 40 to 180° C. to form a polysiloxane solution, a coating fluid containing such a solution is applied on a substrate surface, and the applied film is heat-cured at from 80 to 450° C. to form a film as adhered to the substrate surface, which has a refractive index of from 1.28 to 1.38 and a contact angle with water of from 90 to 1150 (Patent Document 6).

In recent years, along with the progress in weight reduction or thickness reduction of display devices, an antireflection substrate, particularly an antireflection film, to be mounted thereon, is desired to have the film thickness made thin for the purpose of weight reduction, high transparency or the like, whereby there has been a problem that the film is susceptible to a damage by heat. Accordingly, it has been desired more than ever to develop a heat curable coating fluid for forming a film, whereby an antireflection substrate can be obtained by such a low temperature treatment that the film is not susceptible to a damage.

Patent Document 1: JP-A-07-082486
Patent Document 2: JP-A-11-124514
Patent Document 3: JP-A-05-105424
Patent Document 4: JP-A-06-157076
Patent Document 5: JP-A-61-010043
Patent Document 6: JP-A-09-208898

SUMMARY OF THE INVENTION

It is an object of the present invention to provide a coating fluid for forming a film, which is sufficiently curable by heat treatment at a temperature of not higher than 70° C. to form a cured film excellent in abrasion resistance and which is excellent in storage stability, such as a coating fluid for forming a film which is capable of forming a water repellent film showing a low refractive index and being excellent in abrasion resistance, a film obtainable by such a coating fluid, such as a water repellent film, and a process for forming such a film.

Under the above-mentioned circumstances, the present inventors have conducted an extensive study, and as a result, have accomplished the present invention. Namely, the present invention provides the following:

1. A coating fluid for forming a film, which comprises a polysiloxane (A) obtained by condensation polymerization of a silicon compound of the formula (1) as the essential component, and a compound (B) of the formula (2):

wherein $R^1$ is a $C_{1-5}$ hydrocarbon group,

each of $R^2$, $R^3$, $R^4$ and $R^5$ which are independent of one another, is a hydrogen atom or a $C_{1-12}$ organic group.

2. The coating fluid for forming a film according to the above 1, wherein the polysiloxane (A) is a polysiloxane obtained by condensation polymerization of at least one silicon compound of the formula (1) and at least one silicon compound of the formula (3):

wherein $R^6$ is a hydrogen atom or a $C_{1-20}$ organic group, $R^7$ is a $C_{1-5}$ hydrocarbon group, and n is an integer of from 1 to 3.

3. The coating fluid for forming a film according to the above 2, wherein the polysiloxane (A) is a polysiloxane obtained by condensation polymerization in a ratio of from 0.02 to 0.80 mol of the silicon compound of the formula (3) to 1 mol of the silicon compound of the formula (1).

4. The coating fluid for forming a film according to the above 1, wherein the polysiloxane (A) is a polysiloxane obtained by condensation polymerization of at least one silicon compound of the formula (1) and at least one silicon compound of the formula (4):

wherein $R^{2'}$ is a fluorinated $C_{1-20}$ organic group, and $R^{3'}$ is a $C_{1-5}$ hydrocarbon group.

5. The coating fluid for forming a film according to the above 4, wherein the polysiloxane (A) is a polysiloxane obtained by condensation polymerization of at least one silicon compound of the formula (1), at least one silicon compound of the formula (4) and at least one silicon compound of the formula (5)

wherein $R^8$ is a hydrogen atom or a $C_{1-20}$ organic group having no fluorine, $R^9$ is a $C_{1-5}$ hydrocarbon group, and n is an integer of from 1 to 3.

6. The coating fluid for forming a film according to the above 1, which contains from 0.06 to 0.20 mol of the compound of the formula (B) per mol of silicon atoms of the polysiloxane (A).

7. The coating fluid for forming a film according to the above 1, wherein the polysiloxane (A) is a polysiloxane obtained by hydrolytic condensation polymerization of the silicon compound of the formula (1) as the essential component.

8. The coating fluid for forming a film according to the above 1, wherein the polysiloxane (A) is a polysiloxane obtained by heating a mixture of a silicon compound containing the silicon compound of the formula (1) as the essential component, a solvent and oxalic acid.

9. A film obtained by using the coating fluid for forming a film as defined in the above 1.

10. A cured film obtained by applying the coating fluid for forming a film as defined in the above 1 on a substrate and curing it at a temperature of from 40 to 70° C.

11. A water repellent film obtained by applying the coating fluid for forming a film as defined in the above 4 on a substrate and curing it at a temperature of from 40 to 70° C.

12. A water repellent film obtained by applying the coating fluid for forming a film as defined in the above 5 on a substrate and curing it at a temperature of from 40 to 70° C.

13. An anti-reflection substrate having the water repellent film as defined in the above 11.

14. An anti-reflection substrate having the water repellent film as defined in the above 12.

15. An anti-reflection film having the water repellent film as defined in the above 11.

16. An anti-reflection film having the water repellent film as defined in the above 12.

17. A process for forming a film, which comprises applying the coating fluid for forming a film as defined in the above 1 on a substrate and curing it at a temperature of from 40 to 70° C.

The coating fluid for forming a film of the present invention is excellent in storage stability and curable sufficiently by heat treatment at a low temperature at a level of from 40° C. to 70° C. and is capable of presenting a film excellent in abrasion resistance. And, a film obtainable from the coating fluid of the present invention has excellent abrasion resistance as a protective film for e.g. a plastic film. Further, by the process for forming a film of the present invention, it is possible to form a film having such excellent abrasion resistance as mentioned above at a low temperature at a level of from 40° C. to 70° C.

Further, in the coating fluid for forming a film of the present invention, the coating fluid for forming a water repellent film employing a specific polysiloxane, is excellent in storage stability and curable sufficiently by heat treatment at a low temperature at a level of from 40° C. to 70° C. and is capable of providing a water repellent film showing a low refractive index and being excellent in abrasion resistance. And, the water repellent film obtainable from the coating fluid for forming a water repellent film of the present invention can be used suitably for an antireflection substrate such as an anti-reflection film. Further, by the process for forming a water repellent film of the present invention, it is possible to form a water repellent film having such a low refractive index and excellent abrasion resistance as mentioned above at a low temperature at a level of from 40° C. to 70° C.

DETAILED DESCRIPTION OF THE PREFERRED EMBODIMENTS

Now, the present invention will be described in detail.

Polysiloxane (A)

The polysiloxane (A) to be used in the present invention, is obtained by condensation polymerization of a silicon compound of the formula (1) as the essential component:

$$Si(OR^1)_4 \quad (1)$$

wherein $R^1$ is a $C_{1-5}$ hydrocarbon group.

Namely, it is a polysiloxane obtained by condensation polymerization of a tetraalkoxysilane as the essential component.

In the formula (1), $R^1$ is a hydrocarbon group. The smaller the carbon number, the higher the reactivity. Accordingly, it is preferably a $C_{1-5}$ saturated hydrocarbon group. It is more preferably a methyl group, an ethyl group, a propyl group or a butyl group. Specific examples of such a tetraalkoxysilane include tetramethoxysilane, tetraethoxysilane, tetrapropoxysilane and tetrabutoxysilane, and they are readily commercially available.

In the present invention, at least one type among silicon compounds of the formula (1) may be employed, but a plurality of different types may be employed, as the case requires.

Further, the polysiloxane (A) may be one obtained by condensation polymerization of a silicon compound of the formula (1) and a silicon compound of the formula (3):

$$(R^6)_n Si(OR^7)_{4-n} \quad (3)$$

wherein $R^6$ is a hydrogen atom or a $C_{1-20}$ organic group, $R^7$ is a hydrocarbon group, and n is an integer of from 1 to 3.

The silicon compound of the formula (3) is an alkoxysilane having 1, 2 or 3 alkoxy groups and $R^7$ is a hydrocarbon group. Namely, in a case where n is 1 or 2, the plurality of $R^7$ are usually the same in many cases. However, in the present invention, the plurality of $R^7$ may be the same or different.

Specific examples of such a silicon compound of the formula (3) will be shown below.

Namely, a trialkoxysilane such as methyltrimethoxysilane, methyltriethoxysilane, ethyltrimethoxysilane, ethyltriethoxysilane, propyltrimethoxysilane, propyltriethoxysilane, butyltrimethoxysilane, butyltriethoxysilane, pentyltrimethoxysilane, pentyltriethoxysilane, hexyltrimethoxysilane, hexyltriethoxysilane, heptyltrimethoxysilane, heptyltriethoxysilane, octyltrimethoxysilane, octyltriethoxysilane, dodecyltrimethoxysilane, dodecyltriethoxysilane, hexadecyltrimethoxysilane, hexadecyltriethoxysilane, octadecyltrimethoxysilane, octadecyltriethoxysilane, phenyltrimethoxysilane, phenyltriethoxysilane, vinyltrimethoxysilane, vinyltriethoxysilane, γ-aminopropyltrimethoxysilane, γ-aminopropyltriethoxysilane, γ-glycidoxypropyltrimethoxysilane, γ-glycidoxypropyltriethoxysilane, γ-methacryloxypropyltrimethoxysilane, γ-methacryloxypropyltriethoxysilane, trifluoropropyltrimethoxysilane, trifluoropropyltriethoxysilane, tridecafluorooctyltrimethoxysilane, tridecafluorooctyltriethoxysilane, heptadecafluorodecyltrimethoxysilane or heptadecafluorodecyltriethoxysilane, a dialkoxysilane such as dimethyldimethoxysilane or dimethyldiethoxysilane, and a trialkylalkoxysilane such as trimethylmethoxysilane or trimethylethoxysilane, may, for example, be mentioned.

With such a silicon compound, the smaller the carbon number of $R^7$, the higher the reactivity. Accordingly, a carbon number of from 1 to 5 is preferred. More preferred is a carbon number of from 1 to 3.

In the present invention, at least one type selected from silicon compounds of the formula (3) may be employed, but a plurality of different types may be employed as the case requires.

Further, in the present invention, the amount of the silicon compound of the formula (3) to be used in combination with the silicon compound of the formula (1) is not particularly limited, but it is preferably from 0.02 to 0.80 mol per mol of the silicon compound of the formula (1). Further, the polysiloxane (A) may be one obtained by copolymerization of a silicon compound of the formula (1) and a silicon compound of the formula (4). (Hereinafter a coating fluid for forming a film containing such a polysiloxane (A) will be referred to also as "a coating fluid for forming a water repellent film".)

$$(R^{2'})Si(OR^{3'})_3 \quad (4)$$

wherein $R^{2'}$ is a fluorinated $C_{1-14}$ organic group, and $R^{3'}$ is a $C_{1-5}$ hydrocarbon group.

The silicon compound of the formula (4) is one to impart water repellency to the film. Here, $R^{2'}$ in the formula (4) is a fluorinated $C_{1-15}$ organic group. The number of fluorine atoms in this organic group is not particularly limited. Further, $R^{3'}$ in the formula (4) is a $C_{1-5}$ hydrocarbon group, preferably a $C_{1-5}$ saturated hydrocarbon group, more preferably a methyl group, an ethyl group, a propyl group or a butyl group.

Among such silicon compounds of the formula (4), a silicon compound of the formula (4') is preferred.

$$CF_3(CF_2)_m CH_2 CH_2 Si(OR^{10})_3 \quad (4')$$

wherein m is an integer of from 0 to 12, and $R^{10}$ is a $C_{1-5}$ hydrocarbon group.

$R^{10}$ in the formula (4') is a $C_{1-5}$ hydrocarbon group, and like the above $R^{3'}$, it is preferably a $C_{1-5}$ saturated hydrocarbon group, more preferably a methyl group, an ethyl group, a propyl group or a butyl group.

Specific examples of such a silicon compound of the formula (4') include trifluoropropyltrimethoxysilane, trifluoropropyltriethoxysilane, tridecafluorooctyltrimethoxysilane, tridecafluorooctyltriethoxysilane, heptadecafluorodecyltrimethoxysilane and heptadecafluorodecyltriethoxysilane.

In the coating fluid for forming a water repellent film of the present invention, at least one type selected from silicon compounds of the formula (4) may be employed, but a plurality of different types may be employed, as the case requires.

The polysiloxane (A) to be used for the coating fluid for forming a water repellent film of the present invention can be obtained by condensation polymerization of silicon compounds of the formulae (1) and (4), and the ratio of condensation polymerization of the silicon compounds of the formulae (1) and (4) is not particularly limited so long as the polysiloxane is in a homogeneous solution state in the solvent. If the ratio of the silicon compound of the formula (4) is at least 0.05 mol per mol of the silicon compound of the formula (1), a water repellent film having a contact angle with water of at least 90° tends to be easily obtainable, such being desirable. If it is at most 0.43 mol, a homogeneous polysiloxane (A) solution tends to be readily obtainable, such being preferred.

Further, the polysiloxane (A) may be one obtained by condensation polymerization of the silicon compounds of the formulae (1) and (4) and a silicon compound of the formula (5):

wherein $R^8$ is a hydrogen atom or a $C_{1-20}$ organic group having no fluorine, $R^9$ is a $C_{1-5}$ hydrocarbon group, and n is an integer of from 1 to 3.

The silicon compound of the formula (5) is an alkoxysilane having a hydrogen atom or a $C_{1-20}$ organic group having no fluorine, and 1, 2 or 3 alkoxy groups. $R^9$ in the formula (5) is a hydrocarbon group. Namely, when n is 1 or 2, the plurality of $R^9$ may be the same in many cases. However, in the present invention, the plurality of $R^9$ may be the same or different. Specific examples of such a silicon compound of the formula (5) will be shown below.

A trialkoxysilane such as methyltrimethoxysilane, methyltriethoxysilane, ethyltrimethoxysilane, ethyltriethoxysilane, propyltrimethoxysilane, propyltriethoxysilane, butyltrimethoxysilane, butyltriethoxysilane, pentyltrimethoxysilane, pentyltriethoxysilane, hexyltrimethoxysilane, hexyltriethoxysilane, heptyltrimethoxysilane, heptyltriethoxysilane, octyltrimethoxysilane, octyltriethoxysilane, dodecyltrimethoxysilane, dodecyltriethoxysilane, hexadecyltrimethoxysilane, hexadecyltriethoxysilane, octadecyltrimethoxysilane, octadecyltriethoxysilane, phenyltrimethoxysilane, phenyltriethoxysilane, vinyltrimethoxysilane, vinyltriethoxysilane, γ-aminopropyltrimethoxysilane, γ-aminopropyltriethoxysilane, γ-glycidoxypropyltrimethoxysilane, γ-glycidoxypropyltriethoxysilane, γ-methacryloxypropyltrimethoxysilane or γ-methacryloxypropyltriethoxysilane, a dialkoxysilane such as dimethyldimethoxysilane or dimethyldiethoxysilane, and a trialkylalkoxysilane such as trimethylmethoxysilane or trimethylethoxysilane.

In such a silicon compound, $R^9$ is a $C_{1-5}$ hydrocarbon group, preferably a $C_{1-5}$ saturated hydrocarbon group, more preferably a $C_{1-3}$ saturated hydrocarbon group.

In the present invention, a plurality of silicon compounds of the formula (5) may be used as the case requires.

Further, in the present invention, the amount of the silicon compound of the formula (5) to be combined with the silicon compounds of the formulae (1) and (4) is not particularly limited. However, it is preferably from 0.02 to 0.80 mol per mol of the total amount of silicon atoms in the silicon compounds of the formulae (1) and (4).

The polysiloxane (A) to be used in the present invention is not particularly limited so long as it is a condensation polymer of a silicon compound of the formula (1), or silicon compounds of the formulae (1) and (3) or silicon compounds of the formulae (1) and (4), or silicon compounds of the formulae (1), (4) and (5).

The polysiloxane (A) to be used in the present invention can usually be obtained by hydrolysis and condensation polymerization by a known method. The most widely known method is a hydrolysis method wherein pure water or a mixed solution of pure water and a solvent is added by such a method as dropwise addition to a solution having a silicon compound or silicon compounds dissolved in a solvent, followed by heating and stirring at a temperature of at least 40° C. for at least a few hours. In this method, the amount of pure water to be used is optionally suitably selected depending upon the purpose of complete hydrolysis or partial hydrolysis. Usually, it is from 0.4 to 4 mol per mol of the total alkoxy groups of the silicon compounds. In the present invention, either the total hydrolysis or partial hydrolysis may be employed. And, in this hydrolysis method, in order to accelerate the hydrolysis and condensation polymerization reaction, an acid or an alkali may usually be added as a catalyst. As such an acid catalyst, an inorganic acid such as hydrochloric acid or sulfuric acid, or an organic acid such as oxalic acid or formic acid may be mentioned. As an alkali catalyst, an inorganic alkali such as sodium, potassium or ammonia, or various amines may be employed. The heating temperature and heating time may be selected suitably as the case requires. For example, a method of heating and stirring at 50° C. for 24 hours or heating and stirring under reflux for 8 hours, may be mentioned. Further, so long as silicon compounds undergo hydrolysis and condensation polymerization, it is possible to use a method of stirring at room temperature without heating.

Further, another method for obtaining the polysiloxane (A) may, for example, be a method of heating a mixture of a silicon compound or silicon compounds, a solvent and oxalic acid. Specifically, an alcohol is added to oxalic acid to preliminarily obtain an alcohol solution of oxalic acid, and then such a solution is mixed with a silicon compound or silicon compounds, followed by heating. At that time, the amount of oxalic acid is usually from 0.2 to 2 mol per mol of total alkoxy groups in the silicon compound or silicon compounds. The heating in this method may be carried out at a liquid temperature of from 50 to 180° C. For example, it is carried out under reflux for from a few tens minutes to about ten hours.

In any one of the above methods, it is usual to carry out condensation polymerization of silicon compounds at a $SiO_2$ solid content concentration of the charged silicon compounds of at most 20 mass %. By selecting an optional concentration within such concentration range, it is possible to suppress formation of a gel and to obtain a homogeneous polysiloxane-containing solution.

The solvent to be used in the above process is not particularly limited so long as it is capable of dissolving silicon compounds of the formulae (1) and (3), or the formulae (1) and (4), or the formulae (1), (4) and (5). Usually, as an alcohol will be formed by the condensation polymerization reaction of silicon compounds, an alcohol or an organic solvent having good compatibility with an alcohol, may be employed. Specific examples of such an organic solvent include methanol, ethanol, propanol, n-butanol, ethylene glycol monomethyl ether, ethylene glycol monoethyl ether, diethylene glycol monomethyl ether and diethylene glycol monoethyl ether.

In the present invention, the above organic solvents may be used in combination as a mixture of two or more of them.

Compound (B)

The compound (B) to be used in the present invention is an urea of the formula (2) or its derivative.

wherein each of $R^2$, $R^3$, $R^4$ and $R^5$ which are independent of one another, is a hydrogen atom or a $C_{1-12}$ organic group.

The compound (B) is considered to be decomposed by heating or hydrolysis with moisture in the atmosphere to accelerate condensation of alkoxy groups remaining in the coated film thereby to promote curing of the coated film, and accordingly, it is preferably a compound readily decomposable at a low temperature.

Accordingly, each of $R^2$, $R^3$, $R^4$ and $R^5$ in the formula (2) which are independent of one another, is a hydrogen atom or a $C_{1-12}$ organic group, and preferably, each of $R^2$, $R^3$, $R^4$ and $R^5$ which are independent of one another, is a hydrogen atom or a $C_{1-5}$ organic group.

Specific examples of such a urea or its derivative include urea, 1,1-dimethylurea, 1,1-diethylurea, 1,3-dimethylurea, 1,3-diethylurea, tetramethylurea, tetraethylurea, hydroxyethylurea, hydroxypropylurea, ethylurea and propylurea.

The content of such a compound (B) is preferably at least 0.06 mol per mol of silicon atoms in the polysiloxane (A), to facilitate curing at a low temperature. Further, the content of the compound (B) is preferably at most 0.20 mol, whereby the water repellent film will be transparent and free from irregularity, and a high film hardness can easily be obtained.

Other Components

In the present invention, in addition to the polysiloxane solution (A) and the compound (B), other components such as inorganic fine particles, a leveling agent and a surfactant may, for example, be incorporated.

As the inorganic fine particles, fine particles such as silica fine particles, alumina fine particles, titania fine particles and magnesium fluoride fine particles are preferred, and ones in the form of a colloidal solution are particularly preferred. Such a colloidal solution may be one having inorganic fine particles dispersed in a dispersion medium, or it may be a commercially available colloidal solution. In the present invention, by incorporating inorganic fine particles, it becomes possible to impart the surface shape or other functions to the cured film to be formed. As such inorganic fine particles, the average particle diameter is preferably from 0.001 to 0.2 μm, more preferably from 0.001 to 0.1 μm. If the average particle diameter of the inorganic fine particles exceeds 0.2 μm, the transparency of a cured film formed by a coating fluid thus prepared is likely to be low.

As the dispersion medium for the inorganic fine particles, water or an organic solvent may be mentioned. As a colloidal solution, from the viewpoint of the stability of the coating fluid for forming a film, the pH or pKa is preferably adjusted to be from 2 to 10, more preferably from 3 to 7.

The organic solvent to be used as a dispersion medium for the colloidal solution may, for example, be an alcohol such as methanol, isopropyl alcohol, ethylene glycol, butanol or ethylene glycol monopropyl ether, a ketone such as methyl ethyl ketone or methyl isobutyl ketone, an organic hydrocarbon such as toluene or xylene, an amide such as dimethylformamide, dimethylacetamide or N-methylpyrrolidone, an ester such as ethyl acetate, butyl acetate or γ-butyrolactone, or an ether such as tetrahydrofuran or 1,4-dioxane. Among them, an alcohol or a ketone is preferred. These organic solvents may be used alone or in combination as a mixture of two or more of them as a dispersion medium.

Further, the leveling agent and the surfactant may be conventional ones, and commercial products are preferred, since they are readily available.

Coating Fluid for Forming a Film

The method for preparing the coating fluid for forming a film of the present invention is not particularly limited, so long as the polysiloxane (A) and the compound (B) are uniformly mixed. Usually, the polysiloxane (A) is obtained in a state of a solution by condensation polymerization of a silicon compound or silicon compounds in a solvent. Therefore, a method wherein a solution of the polysiloxane (A) obtained by condensation polymerization of a silicon compound or silicon compounds (hereinafter referred to as a polysiloxane (A) solution) is mixed as it is with the compound (B), is preferred. Otherwise, as the case requires, the polysiloxane (A) solution may be concentrated or diluted by an addition of a solvent, or the solvent may be substituted by another solvent, and then mixed with the compound (B). Further, the polysiloxane (A) solution and the compound (B) may be mixed and then the solvent may be added.

The $SiO_2$ solid content concentration in the coating fluid for forming a film at that time is preferably from 0.5 to 15 mass %. If the $SiO_2$ concentration is lower than 0.5 mass %, it tends to be difficult to obtain a desired film thickness by one coating operation, and if it is higher than 15 mass %, the pot life of the solution is likely to be inadequate.

The solvent to be used for dilution or substitution may be the same solvent as used for the condensation polymerization of the silicon compounds or may be another solvent. Such a solvent is not particularly limited so long as it does not impair the compatibility with the polysiloxane (A) and the compound (B), and one solvent or a plurality of solvents may optionally be selected for use.

Specific examples of such a solvent include an alcohol such as methanol, ethanol, isopropanol, butanol or diacetone alcohol, a ketone such as acetone, methyl ethyl ketone or methyl isobutyl ketone, a glycol such as ethylene glycol, propylene glycol or hexylene glycol, a glycol ether such as methyl cellosolve, ethyl cellosolve, butyl cellosolve, ethyl carbitol, butyl carbitol, diethylene glycol monomethyl ether, propylene glycol monomethyl ether or propylene glycol monobutyl ether, and an ester such as methyl acetate, ethyl acetate or ethyl lactate.

The method for mixing the above-mentioned other components is not particularly limited, and they may be mixed at the same time as the polysiloxane (A) and the compound (B) or after mixing the polysiloxane (A) and the compound (B).

Specific examples of the coating fluid for forming a film in the present invention will be mentioned below.

(1) A coating fluid for forming a film comprising the polysiloxane (A) and the compound (B).

(2) The coating fluid for forming a film comprising the above (1) and inorganic fine particles.

(3) The coating fluid for forming a film comprising the above (1) or (2), and at least one member selected from the group consisting of a leveling agent and a surfactant.

Formation of a Film

The coating fluid for forming a film of the present invention is applied to a substrate, followed by heat curing to obtain a desired film. As the coating method, a known or well known method may be employed. For example, a method such as a dipping method, a flow coating method, a spraying method, a bar coating method, a gravure coating method, a roll coating method, a blade coating method or an air knife coating method may be employed. At that time, the substrate to be used may be a substrate made of e.g. plastic, glass or ceramics. As a plastic substrate, a plate or film of e.g. polycarbonate, poly(meth)acrylate, polyether sulfone, polyarylate, polyurethane, polysulfone, polyether, polyether ketone, trimethylpentene, polyolefin, polyethylene terephthalate, (meth)acrylonitrile, triacetyl cellulose, diacetyl cellulose or acetate butyrate cellulose may, for example, be mentioned.

The film formed on the substrate may be heat-cured as it is at a temperature of from 40 to 70° C. However, it may be dried beforehand at a temperature of from room temperature to 100° C. and then heat-cured. In such a case, is the time required for drying is preferably from 10 seconds to 6 minutes.

The time required for heat curing may suitably be selected depending upon the desired film characteristics. However, it is usually from 1 hour to 7 days. When a low curing temperature is selected, the curing time may be prolonged to obtain a cured film having sufficient abrasion resistance.

Further, the coating fluid for forming a film of the present invention is capable of obtaining a film excellent in abrasion resistance even at a curing temperature exceeding 70° C.

A water repellent film of the present invention obtained by the above method using a coating fluid for forming a water repellent film has characteristics such that the contact angle with water is at least 90°, the refractive index is low at a level of at most 1.4 and it is excellent in abrasion resistance. Accordingly, it is particularly useful for antireflection purposes.

In a case where the water repellent film of the present invention is to be used for the antireflection purposes, the water repellent film of the present invention is formed on a substrate having a refractive index higher than the refractive index of the water repellent film of the present invention, e.g. on the surface of usual glass, whereby it is readily possible to convert such a substrate to a substrate having an antireflection ability. The water repellent film of the present invention is effective when it is used as a single film on the substrate surface, but it may also be effectively used for an antireflective multilayered body having the film formed on an underlayer film having a high refractive index.

With respect to the relation between the thickness of a film and the wavelength of light, it is known that between the thickness d (nm) of a film having a refractive index a and the wavelength $\lambda$ (nm) of light desired to have the reflectance reduced by the film, a relation of $d=(2b-1)\lambda/4a$ (wherein b is an integer of at least 1) is satisfied. Accordingly, by setting the thickness of the film by using this formula, it is readily possible to prevent reflection of light with the desired wavelength. In a specific example, in a case where with respect to light with a wavelength of 550 nm, in order to prevent reflection of light from a glass surface by forming a film having a refractive index of 1.32, such numerical values may be substituted for $\lambda$ and a in the above formula to obtain the optimum film thickness. At that time, an optional positive integer may be substituted for b. For example, the film thickness obtained by substituting 4 for b is 104 nm, and the film thickness obtained by substituting 2 for b is 312 nm. By adopting the film thickness thus calculated, it is readily possible to impart an antireflection ability.

The thickness of the film to be formed on a substrate may be adjusted by the film thickness during the coating, but it may easily be adjusted by adjusting the $SiO_2$ concentration in the coating fluid.

A water repellent film of the present invention is useful in a field where antireflection of light is desired, such as a cathode ray tube made of glass, a display of a computer, a mirror having a glass surface or a showcase made of glass. Further, the water repellent film of the present invention has sufficient practical efficiency from the viewpoint of an antifouling property in that a fingerprint or oil-based ink can easily be wiped off, and it can sufficiently be cured by low temperature treatment at a level of from 40 to 70° C., whereby it is useful particularly for an antireflection film for a liquid crystal TV or a display monitor.

Now, the present invention will be described in further detail with reference to Preparation Examples, Working Examples and Comparative Examples. However, it should be understood that the present invention is by no means restricted by the following Examples.

Abbreviations in the Examples are as follows.
TEOS: Tetraethoxysilane
MTES: Methyltriethoxysilane
HTES: Hexyltriethoxysilane
MPS: γ-Mercaptopropyltrimethoxysilane
MAPS: γ-Methacryloxypropyltrimethoxysilane
GPS: γ-Glycidoxypropyltrimethoxysilane
FS-03: 3,3,3-Trifluoropropyltrimethoxysilane
FS-13: Tridecafluorooctyltrimethoxysilane
FS-17: Heptadecafluorododecyltrimethoxysilane
1,1-DMU: 1,1-Dimethylurea
1,3-DMU: 1,3-Dimethylurea
TMU: Tetramethylurea
HEU: Hydroxyethylurea
BCS: Butyl cellosolve The measuring methods used in the following Preparation Examples are as Follows.

Method for Measuring Residual Alkoxysilane Monomer

The alkoxysilane monomer remaining in the solution of the polysiloxane (A) was measured by gas chromatography (hereinafter referred to as GC).

The GC measurement was carried out under the following conditions by using Shimadzu GC-14B, manufactured by Shimadzu Corporation.

Column: Capillary column CBPI-W25-100 (25 mm×0.53 mm$\phi$×1 μm)

Column temperature: It was raised at a rate of 15° C./min from the initial temperature of 50° C. to the final temperature of 290° C. (3 minutes).

Amount of sample injected: 1 μL, injection temperature: 240° C., detector temperature: 290° C., carrier gas: nitrogen (flow rate: 30 mL/min), detection method: FID method.

Preparation Example 1

Into a four-necked reaction flask equipped with a reflux condenser, 61.16 g of ethanol was put, and 18.01 g of oxalic acid was gradually added with stirring to obtain an ethanol solution of oxalic acid. Then, this solution was heated, and 20.83 g of TEOS was dropwise added under reflux. After the dropwise addition, refluxing was carried out for 5 hours, followed by cooling naturally to room temperature to obtain a polysiloxane (A) solution (P1). This polysiloxane (A) solution (P1) was measured by GC, whereby no alkoxysilane monomer was detected.

Preparation Examples 2 to 4

With compositions shown in Table I-1, polysiloxane (A) solutions (P2 to P4) were obtained in the same manner as in Preparation Example 1. At that time, instead of TEOS in Preparation Example 1, a monomer mixture having a plurality of silicon compounds (hereinafter referred to as monomers) preliminarily mixed, was used.

The obtained polysiloxane (A) solutions (P2 to P4) were respectively measured by GC, whereby no alkoxysilane monomer was detected.

TABLE I-1

|  | Polysiloxane (A) solution | Silicon compound (g) | Oxalic acid (g) | Ethanol (g) |
|---|---|---|---|---|
| Preparation Example 1 | P1 | TEOS 20.83 (0.10 mol) | 18.01 | 61.16 |

TABLE I-1-continued

|  | Polysiloxane (A) solution | Silicon compound (g) | | Oxalic acid (g) | Ethanol (g) |
|---|---|---|---|---|---|
| Preparation Example 2 | P2 | TEOS 18.75 (0.09 mol) | MTES 8.92 (0.01 mol) | 18.01 | 61.45 |
| Preparation Example 3 | P3 | TEOS 18.75 (0.09 mol) | HTES 2.07 (0.01 mol) | 18.01 | 61.17 |
| Preparation Example 4 | P4 | TEOS 18.75 (0.09 mol) | MAPS 2.48 (0.01 mol) | 18.01 | 60.76 |

Preparation Example 5

Into a four-necked reaction flask equipped with a reflux condenser, 50.11 g of ethanol was put, and 34.73 g of TEOS was added with stirring. Then, a solution having 0.15 g of oxalic acid dissolved in 15.01 g of water was gradually dropwise added. Thereafter, the mixture was heated, refluxed for 1 hour and then left to cool to room temperature to obtain a polysiloxane (A) solution (P5). This polysiloxane (A) solution (P5) was measured by GC, whereby no alkoxysilane monomer was detected.

Preparation Example 6

Into a four-necked reaction flask equipped with a reflux condenser, 50.31 g of ethanol was put, and 31.26 g of TEOS and 3.27 g of MPS were added with stirring. Then, a solution having 0.15 g of oxalic acid dissolved in 15.01 g of water was gradually dropwise added. Thereafter, the mixture was heated, refluxed for 1 hour and then left to cool to room temperature to obtain a polysiloxane (A) solution (P6). This polysiloxane (A) solution (P6) was measured by GC, whereby no alkoxysilane monomer was detected.

Preparation Example 7

Into a 300 ml eggplant type flask, 48.59 g of ethanol was put, and 34.68 g of TEOS was added with stirring. Then, a diluted solution having 1.74 g of a 60% nitric acid aqueous solution added to 14.99 g of water, was gradually dropwise added. Thereafter, the mixture was stirred at room temperature for 1 hour to obtain a polysiloxane (A) solution (P7). This polysiloxane (A) solution (P7) was measured by GC, whereby no alkoxysilane monomer was detected.

Examples 1 to 11 and Comparative Examples 1 to 3

With the compositions shown in Table I-2, the polysiloxane (A) solution, the compound (B), BCS and ethanol were mixed to obtain coating fluids (Q1 to Q11).

Further, in Comparative Examples, with the compositions shown in Table I-2, the polysiloxane (A) solution, BCS and ethanol were mixed to obtain coating fluids (T1 to T3).

TABLE I-2

| | Coating fluid | Polysiloxane (A) solution (g) | Compound (B) (g) | BCS (g) | Ethanol (g) | Molar ratio of Si/Compound (b) |
|---|---|---|---|---|---|---|
| Ex. 1 | Q1 | P1 33.33 | Urea 0.12 | 10.00 | 56.56 | 100/6 |
| Ex. 2 | Q2 | P1 33.33 | 1,1-DMU 0.35 | 10.00 | 56.32 | 100/12 |
| Ex. 3 | Q3 | P1 33.33 | 1,3-DMU 0.17 | 10.00 | 56.50 | 100/6 |
| Ex. 4 | Q4 | P1 33.33 | TMU 0.46 | 10.00 | 56.21 | 100/12 |
| Ex. 5 | Q5 | P1 33.33 | HEU 0.21 | 10.00 | 56.46 | 100/6 |
| Ex. 6 | Q6 | P2 33.33 | Urea 0.24 | 10.00 | 56.43 | 100/12 |
| Ex. 7 | Q7 | P3 33.33 | Urea 0.24 | 10.00 | 56.43 | 100/12 |
| Ex. 8 | Q8 | P4 33.33 | Urea 0.24 | 10.00 | 56.43 | 100/12 |
| Ex. 9 | Q9 | P5 20 | Urea 0.24 | 10.00 | 69.76 | 100/12 |
| Ex. 10 | Q10 | P6 20.00 | Urea 0.24 | 10.00 | 69.76 | 100/12 |
| Ex. 11 | Q11 | P7 20.00 | Urea 0.12 | 10.00 | 69.88 | 100/6 |
| Comp. Ex. 1 | T1 | P1 33.33 | — | 10.00 | 56.67 | — |
| Comp. Ex. 2 | T2 | P6 20.00 | — | 10.00 | 70.00 | — |
| Comp. Ex. 3 | T3 | P7 20.00 | — | 10.00 | 70.00 | — |

The storage stability of the prepared coating fluids (Q1 to Q11 and T1 to T3) was evaluated by the following method. The results are shown in Table I-3.

Storage Stability

Each coating fluid was left to stand still at room temperature for 1 month, and then 100 cc thereof was subjected to filtration by means of a non-aqueous type polytetrafluoroethylene filter having a pore diameter of 0.45 μm and φ×L being 18×22 mm (Chromatodisk 13N, manufactured by Kurabo Industries Ltd.), whereby one which was filterable was identified by ○, and one which led to clogging was identified by X.

Further, each coating fluid (Q1 to Q11 and T1 to T3) was applied on a silica-coated glass substrate by means of a bar coater (No. 9) to form a coated film. It was left to stand at room temperature for 30 seconds and then dried in a clean oven at 100° C. for 5 minutes to form a cured film under the condition as identified in Table I-3. With respect to the obtained cured film, the adhesion and abrasion resistance were evaluated by the following methods. The evaluation methods are as follows, and the evaluation results are shown in Table I-3.

Adhesion

Each cured film on the substrate was cross-cut at 1 mm intervals to form 100 sections, and an adhesive tape (Cellotape®, manufactured by Nichiban Co., Ltd., 24 mm in width) was firmly bonded to the cured film, and then, the adhesive tape was quickly peeled whereby presence or absence of peeling of the cured film was visually confirmed. One having no peeling was identified by ○, and one having peeling observed was identified by X.

Abrasion Resistance

By means of steel wool #0000 manufactured by Nippon Steel Wool, each cured film was rubbed 10 reciprocations under a load of 300 g/cm², and scratching on the cured film surface was visually evaluated. The evaluation standards were as follows.

A: 0 to 5 scratch marks, B: 6 to 10 scratch marks, C: 11 to 20 scratch marks, D: 21 or more scratch marks

TABLE I-3

| | Coating fluid | Curing conditions Temp. | Curing conditions Time | Storage stability | Adhesion | Abrasion resistance |
|---|---|---|---|---|---|---|
| Ex. 1 | Q1 | 40° C. | 3 days | ○ | ○ | A |
| Ex. 2 | Q2 | 40° C. | 3 days | ○ | ○ | A |
| Ex. 3 | Q3 | 40° C. | 3 days | ○ | ○ | A |
| Ex. 4 | Q4 | 40° C. | 3 days | ○ | ○ | A |
| Ex. 5 | Q5 | 40° C. | 3 days | ○ | ○ | A |
| Ex. 6 | Q6 | 40° C. | 3 days | ○ | ○ | A |
| Ex. 7 | Q7 | 40° C. | 3 days | ○ | ○ | A |
| Ex. 8 | Q8 | 40° C. | 3 days | ○ | ○ | A |
| Ex. 9 | Q9 | 40° C. | 3 days | ○ | ○ | B |
| Ex. 10 | Q10 | 40° C. | 4 hours | ○ | ○ | A |
| Ex. 11 | Q11 | 40° C. | 2 hours | ○ | ○ | A |
| Comp. Ex. 1 | T1 | 40° C. | 3 days | ○ | ○ | D |
| Comp. Ex. 2 | T2 | 40° C. | 4 hours | ○ | ○ | D |
| Comp. Ex. 3 | T3 | 40° C. | 2 hours | ○ | ○ | D |

Examples 1 to 11 were excellent in storage stability and adhesion, and the abrasion resistance was excellent at a level of at least B.

In Comparative Examples 1 to 3 containing no compound (B), the abrasion resistance was D, and many scratch marks were observed on the film surface.

Reference Example 1

The prepared coating fluid Q1 was applied on a silica-coated glass substrate by means of a bar coater (No. 9) to form a film. It was left to stand at room temperature for 30 seconds and then dried in a clean oven at 100° C. for 5 minutes. Thereafter, no heat treatment for curing was carried out. With respect to this film, the adhesion and abrasion resistance were evaluated in the same manner as in the above Examples, whereby the adhesion was ○, and the abrasion resistance was D.

Now, Examples relating to coating fluids for forming water repellent films will be described.

Preparation Example 21

Into a four-necked reaction flask equipped with a reflux condenser, 58.56 g of methanol was put, and 18.01 g of oxalic acid was gradually added with stirring to prepare an ethanol solution of oxalic acid. Then, this solution was heated and a mixture of TEOS (18.75 g) and FS-13 (4.68 g) was dropwise added under reflux. After the dropwise addition, the mixture was refluxed for 5 hours and left to cool to room temperature to obtain a polysiloxane (A) solution (P21). This polysiloxane (A) solution (P21) was measured by GC, whereby no alkoxysilane monomer was detected.

Preparation Examples 22 to 27

With the compositions shown in Table II-1, polysiloxane (A) solutions (P22 to P27) were obtained in the same manner as in Preparation Example 21. At that time, a plurality of silicon compounds (hereinafter referred to as monomers) were preliminarily mixed for use.

The obtained polysiloxane (A) solutions (P22 to P27) were respectively measured by GC, whereby no alkoxysilane monomer was detected.

TABLE II-1

| | Polysiloxane (A) solution | Silicon compounds (g) | | | Oxalic acid (g) | Methanol (g) |
|---|---|---|---|---|---|---|
| Prep. Ex. 21 | P21 | TEOS 18.75 0.0900 mol | FS-13 4.68 0.0100 mol | — | 18.01 | 58.56 |
| Prep. Ex. 22 | P22 | TEOS 18.23 0.0875 mol | FS-13 5.85 0.0125 mol | — | 18.01 | 57.91 |
| Prep. Ex. 23 | P23 | TEOS 17.71 0.0850 mol | FS-13 7.02 0.0150 mol | — | 18.01 | 57.26 |
| Prep. Ex. 24 | P24 | TEOS 17.19 0.0825 mol | FS-13 8.19 0.0175 mol | — | 18.01 | 56.61 |
| Prep. Ex. 25 | P25 | TEOS 17.71 0.0850 mol | FS-13 4.68 0.0100 mol | GPS 1.18 0.0050 mol | 18.01 | 58.42 |
| Prep. Ex. 26 | P26 | TEOS 17.71 0.0850 mol | FS-03 3.27 0.0150 mol | | 18.01 | 61.01 |
| Prep. Ex. 27 | P27 | TEOS 19.79 0.0950 mol | FS-17 2.84 0.0050 mol | | 18.01 | 59.36 |

Examples 21 to 31, and Comparative Examples 21 to 27

With the compositions shown in Table II-2, the polysiloxane (A) solution, the compound (B), BCS and methanol were mixed to obtain coating fluids (Q21 to Q31).

Further, in Comparative Examples, with the compositions shown in Table II-2, the polysiloxane (A) solution, BCS and methanol were mixed to obtain coating fluids (T21 to T27).

TABLE II-2

| Coating fluid | Polysiloxane (A) solution (g) | Compound (B) (g) | BCS (g) | Methanol (g) | Molar ratio of Si/Compound (b) |
|---|---|---|---|---|---|
| Ex. 21 | Q21 33.33 | P21 Urea 0.24 | 10.00 | 56.43 | 100/12 |
| Ex. 22 | Q22 33.33 | P22 Urea 0.24 | 10.00 | 56.43 | 100/12 |
| Ex. 23 | Q23 33.33 | P23 Urea 0.24 | 10.00 | 56.43 | 100/12 |
| Ex. 24 | Q24 33.33 | P24 Urea 0.24 | 10.00 | 56.43 | 100/12 |
| Ex. 25 | Q25 33.33 | P25 Urea 0.24 | 10.00 | 56.43 | 100/12 |
| Ex. 26 | Q26 33.33 | P23 1,1-DMU 0.35 | 10.00 | 56.32 | 100/12 |
| Ex. 27 | Q27 33.33 | P23 1,3-DMU 0.35 | 10.00 | 56.32 | 100/12 |
| Ex. 28 | Q28 33.33 | P23 TMU 0.46 | 10.00 | 56.21 | 100/12 |
| Ex. 29 | Q29 33.33 | P23 HEU 0.42 | 10.00 | 56.25 | 100/12 |
| Ex. 30 | Q30 33.33 | P26 Urea 0.24 | 10.00 | 56.43 | 100/12 |
| Ex. 31 | Q31 33.33 | P27 Urea 0.24 | 10.00 | 56.43 | 100/12 |
| Comp. Ex. 21 | T21 33.33 | P21 — | 10.00 | 56.67 | — |
| Comp. Ex. 22 | T22 33.33 | P22 — | 10.00 | 56.67 | — |
| Comp. Ex. 23 | T23 33.33 | P23 — | 10.00 | 56.67 | — |
| Comp. Ex. 24 | T24 33.33 | P24 — | 10.00 | 56.67 | — |
| Comp. Ex. 25 | T25 33.33 | P25 — | 10.00 | 56.67 | — |
| Comp. Ex. 26 | T26 33.33 | P26 — | 10.00 | 56.67 | — |
| Comp. Ex. 27 | T27 33.33 | P27 — | 10.00 | 56.67 | — |

The storage stability of the prepared coating fluids (Q21 to Q31 and T21 to T27) was evaluated by the following method. The results are shown in Table II-3.

Storage Stability

Each coating fluid was left to stand still at room temperature for 1 month, and then 100 cc thereof was subjected to filtration by means of a non-aqueous type polytetrafluoroethylene filter having a pore diameter of 0.45 µm and φ×L being 18×22 mm (Chromatodisk 13N, manufactured by Kurabo Industries Ltd.), whereby one which was filterable was identified by ○, and one which led to clogging was identified by X.

Each prepared coating fluid (Q21 to Q31 and T21 to T27) was applied on a triacetyl cellulose (hereinafter referred to as TAC) film (film thickness: 80 µm, reflectance at a wavelength of 550 nm: 4.5%) subjected to the following treatment, by means of a bar coater (No. 3) to form a film. It was left to stand at room temperature for 30 seconds and then dried in a clean oven at 100° C. for 5 minutes, followed by curing at a temperature of 40° C. for 3 days. With respect to the obtained cured film, the contact angle with water, the oil-based ink wiping efficiency, the fingerprint wiping efficiency, the adhesion, the reflectance and the abrasion resistance were evaluated. The evaluation methods thereof are as follows, and the evaluation results are shown in Table II-3 and II-4.

Method for Surface Treatment of TAC Film

A coated TAC film (film thickness: 80 µm) manufactured by Nippon Paper Industries Co., Ltd. was immersed in a 5 mass % potassium hydroxide (KOH) aqueous solution heated to 40° C. for 3 minutes to carry out alkali treatment, followed by washing with water. Then, it was immersed in a 0.5 mass % sulfuric acid ($H_2SO_4$) aqueous solution at room temperature for 30 seconds for neutralization, followed by washing with water and drying.

Contact Angle with Water

Using an automatic contact angle meter CA-Z model, manufactured by Kyowa Interface Science Co., Ltd., the contact angle when 3 µl of pure water was dropped, was measured.

Oil-Based Ink Wiping Efficiency

An ink applied on the surface of a cured film by means of an oil-based ink pen manufactured by Pentel Co., Ltd., was wiped off by means of BEMCOT M-3 manufactured by Asahi Kasei Corporation, whereby the wiping efficiency was visually evaluated. A case where the ink was completely wiped off was identified by ○, and any other cases were identified by X.

Fingerprint Wiping Efficiency

A fingerprint was applied on the surface of a cured film and wiped off by means of BEMCOT M-3 manufactured by Asahi Kasei Corporation, whereby the wiping efficiency was visually evaluated. A case where the fingerprint was completely wiped off was identified by ○, and any other cases were identified by X.

Adhesion

Each cured film on the substrate was cross-cut at 1 mm intervals to form 100 sections, and an adhesive tape (Cellotape®, manufactured by Nichiban Co., Ltd., 24 mm in width) was firmly bonded to the cured film, and then, the adhesive tape was quickly peeled whereby presence or absence of peeling of the cured film was visually confirmed. One having no peeling was identified by ○, and one having peeling observed was identified by X.

Method for Measuring Reflectance

Using spectrophotometer UV3100PC manufactured by Shimadzu Corporation, light with a wavelength of 550 nm was permitted to enter to a cured film at an incidence angle of 5°, whereby the reflectance was measured.

Abrasion Resistance

By means of steel wool #0000 manufactured by Nippon Steel Wool, each cured film was rubbed 10 reciprocations under a load of 200 g/cm$^2$, and scratching on the cured film surface was visually evaluated. The evaluation standards were as follows.

A: 0 to 5 scratch marks, B: 6 to 10 scratch marks, C: 11 to 20 scratch marks, D: 21 or more scratch marks Further, each prepared coating fluid (Q21 to Q31 and 21 to T27) was applied on a silicon wafer by spin coating to form a film. Then, it was left to stand for 30 seconds at room temperature, then dried in a clean oven at 100° C. for 5 minutes and then cured at a temperature of 40° C. for 3 days to obtain a cured film having a thickness of 100 nm. With respect to the obtained cured film, the refractive index was evaluated by the following method. The evaluation results are shown in Table II-4.

Method for Measuring Refractive Index

Using Ellipsometer DVA-36L manufactured by Mizojiri Optical Co., Ltd., the refractive index was measured with light having a wavelength of 633 nm.

TABLE II-3

| | Coating fluid | Storage stability | Contact angle with water (°) | Oil-based ink wiping efficiency | Fingerprint wiping efficiency |
|---|---|---|---|---|---|
| Ex. 21 | Q21 | ○ | >100 | ○ | ○ |
| Ex. 22 | Q22 | ○ | >100 | ○ | ○ |
| Ex. 23 | Q23 | ○ | >100 | ○ | ○ |
| Ex. 24 | Q24 | ○ | >100 | ○ | ○ |
| Ex. 25 | Q25 | ○ | >100 | ○ | ○ |
| Ex. 26 | Q26 | ○ | >100 | ○ | ○ |
| Ex. 27 | Q27 | ○ | >100 | ○ | ○ |
| Ex. 28 | Q28 | ○ | >100 | ○ | ○ |
| Ex. 29 | Q29 | ○ | >100 | ○ | ○ |
| Ex. 30 | Q30 | ○ | 92 | ○ | ○ |
| Ex. 31 | Q31 | ○ | >100 | ○ | ○ |
| Comp. Ex. 21 | T21 | ○ | >100 | ○ | ○ |
| Comp. Ex. 22 | T22 | ○ | >100 | ○ | ○ |
| Comp. Ex. 23 | T23 | ○ | >100 | ○ | ○ |
| Comp. Ex. 24 | T24 | ○ | >100 | ○ | ○ |
| Comp. Ex. 25 | T25 | ○ | >100 | ○ | ○ |
| Comp. Ex. 26 | T26 | ○ | 92 | ○ | ○ |
| Comp. Ex. 27 | T27 | ○ | >100 | ○ | ○ |

TABLE II-4

| | Coating fluid | Refractive index | Reflectance (%) | Adhesion | Abrasion resistance |
|---|---|---|---|---|---|
| Ex. 21 | Q21 | 1.380 | 1.5 | ○ | A |
| Ex. 22 | Q22 | 1.375 | 1.4 | ○ | A |
| Ex. 23 | Q23 | 1.370 | 1.3 | ○ | A |
| Ex. 24 | Q24 | 1.365 | 1.2 | ○ | A |
| Ex. 25 | Q25 | 1.390 | 1.7 | ○ | A |
| Ex. 26 | Q26 | 1.370 | 1.3 | ○ | A |
| Ex. 27 | Q27 | 1.370 | 1.3 | ○ | A |
| Ex. 28 | Q28 | 1.370 | 1.3 | ○ | A |
| Ex. 29 | Q29 | 1.370 | 1.3 | ○ | A |
| Ex. 30 | Q30 | 1.390 | 1.7 | ○ | A |
| Ex. 31 | Q31 | 1.380 | 1.5 | ○ | A |
| Comp. Ex. 21 | T21 | 1.380 | 1.5 | ○ | C |
| Comp. Ex. 22 | T22 | 1.375 | 1.4 | ○ | C |
| Comp. Ex. 23 | T23 | 1.370 | 1.3 | ○ | D |
| Comp. Ex. 24 | T24 | 1.365 | 1.2 | ○ | D |
| Comp. Ex. 25 | T25 | 1.390 | 1.7 | ○ | D |
| Comp. Ex. 26 | T26 | 1.390 | 1.7 | ○ | C |
| Comp. Ex. 27 | T27 | 1.380 | 1.5 | ○ | D |

As shown in Table II-3 and II-4, in Examples 21 to 31, at a curing temperature of 40° C., the abrasion resistance was excellent at a level of A, and the contact angle with water was also excellent at a level of at least 90°.

And, the storage stability of the coating fluids (Q21 to Q31) was good, and they were stable even after storage at room temperature for 6 months.

Further, in Examples 21 to 31, characteristics of a low refractive index of not higher than 1.4 and low reflectance are shown.

On the other hand, in Comparative Examples 21 to 27 employing coating fluids (T21 to T27) containing no compound (B), at a curing temperature of 40° C., the abrasion resistance was inadequate at a level of C or D.

Further, as shown in Tables II-3 and II-4, Examples 21 to 31 were excellent in antifouling properties such as fingerprint wiping efficiency and oil-based ink wiping efficiency, and the adhesion to the substrate was high.

Reference Example 21

The prepared coating fluid Q21 was applied on a TAC filter (film thickness: 80 μm, reflectance at a wavelength of 550 nm: 4.5%) subjected to the above-mentioned treatment, by means of a bar coater (No. 3) to form a film. It was left to stand at room temperature for 30 seconds, then dried in a clean oven at 100° C. for 5 minutes, and thereafter, no heat treatment for curing was carried out. With respect to this film, the contact angle with water, oil-based ink wiping efficiency, fingerprint wiping efficiency, adhesion, reflectance and abrasion resistance were evaluated in the same manner as in Examples 21 to 31. As a result, the contact angle with water was larger than 100° (>100°), the oil-based ink wiping efficiency was ○, the fingerprint wiping efficiency was ○, the adhesion was ○, the reflectance was 1.5%, and the abrasion resistance was D.

INDUSTRIAL APPLICABILITY

The coating fluid for forming a film of the present invention is excellent in storage stability and can be cured sufficiently by low temperature heat treatment at a level of from 40° C. to 70° C. to provide a film excellent in abrasion resistance. Therefore, it is useful for e.g. a protective film for plastics, glass, ceramics, etc.

Further, the coating fluid for forming a water repellent film of the present invention is excellent in storage stability and can be cured sufficiently by low temperature heat treatment at a level of from 40° C. to 70° C. to provide a water repellent film having a low refractive index and being excellent in abrasion resistance. Therefore, it is particularly useful for an antireflection substrate, especially as an antireflection film for display devices.

Further, the process for forming such a film is industrially useful with excellent storage stability of the coating fluid for forming a film of the present invention.

The entire disclosures of Japanese Patent Application No. 2005-177434 filed on Jun. 17, 2005 and Japanese Patent Application No. 2005-178016 filed on Jun. 17, 2005 including specifications, claims and summaries are incorporated herein by reference in their entireties.

The invention claimed is:

1. A coating fluid for forming a film, which comprises
   a polysiloxane (A) obtained by condensation polymerization of at least one silicon compound of the formula (1) and at least one silicon compound of the formula (4):

$Si(OR^1)_4$            (1)

$(R^{2'})Si(OR^{3'})_3$            (4)

wherein $R^1$ is a $C_{1-5}$ hydrocarbon group; $R^{2'}$ is a fluorinated $C_{1-20}$ organic group; and $R^{3'}$ is a $C_{1-5}$ hydrocarbon group; and a compound (B) of the formula (2):

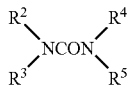

each of $R^2$, $R^3$, $R^4$ and $R^5$ which are independent of one another, is a hydrogen atom or a $C_{1-5}$ organic group, hydroxyethyl or hydroxypropyl.

2. The coating fluid for forming a film according to claim 1, wherein the polysiloxane (A) is a polysiloxane obtained by condensation polymerization in a ratio ranging from 0.02 to 0.80 mol of the silicon compound of the formula (4) to 1 mol of the silicon compound of the formula (1).

3. The coating fluid for forming a film according to claim 1, which comprises from 0.06 to 0.20 mol of the compound of the formula (B) per mol of silicon atoms of the polysiloxane (A).

4. The coating fluid for forming a film according to claim 1, wherein said condensation polymerization occurs by heating a mixture of a silicon compound comprises the silicon compound of the formula (1), the silicon compound of formula (4), a solvent and oxalic acid.

5. A film obtained by curing the coating fluid for forming a film as defined in claim 1.

6. A water repellent film obtained by applying the coating fluid for forming a film as defined in claim 1 on a substrate and curing said coating fluid at a temperature ranging from 40 to 70° C.

7. An anti-reflection substrate having the water repellent film as defined in claim 6.

8. An anti-reflection film having the water repellent film as defined in claim 6.

9. A coating fluid for forming a film, which comprises
a polysiloxane (A) obtained by condensation polymerization of at least one silicon compound of the formula (1); at least one silicon compound of the formula (4); and at least one at least one silicon compound of the formula (5):

$$Si(OR^1)_4 \quad (1)$$

$$(R^{2'})Si(OR^{3'})_3 \quad (4)$$

$$(R^8)_nSi(OR^9)_{4-n} \quad (5)$$

wherein $R^1$ is a $C_{1-5}$ hydrocarbon group, $R^{2'}$ is a fluorinated $C_{1-20}$ organic group, and $R^{3'}$ is a $C_{1-5}$ hydrocarbon group, $R^8$ is a hydrogen atom or a $C_{1-12}$ organic group having no fluorine, $R^9$ is a $C_{1-5}$ hydrocarbon group, and n is an integer ranging from 1 to 3; and
a compound (B) of the formula (2):

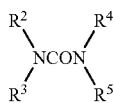

each of $R^2$, $R^3$, $R^4$ and $R^5$ which are independent of one another, is a hydrogen atom or a $C_{1-5}$ organic group, hydroxyethyl or hydroxypropyl.

10. A water repellent film obtained by applying the coating fluid for forming a film as defined in claim 9 on a substrate and curing said coating fluid at a temperature ranging from 40 to 70° C.

11. An anti-reflection substrate having the water repellent film as defined in claim 10.

12. An anti-reflection film having the water repellent film as defined in claim 10.

13. A cured film obtained by applying a coating fluid for forming a film on a substrate and curing said coating fluid at a temperature ranging from 40 to 70° C., wherein said coating fluid comprises
a polysiloxane (A) that consists essentially of the condensation polymerization product of a silicon compound of formula (1) as the essential component:

$$Si(OR^1)_4 \quad (1)$$

wherein $R^1$ is a $C_{1-5}$ hydrocarbon group, and
a compound (B) of the formula (2):

each of $R^2$, $R^3$, $R^4$ and $R^5$ which are independent of one another, is a hydrogen atom or a $C_{1-5}$ organic group, hydroxyethyl or hydroxypropyl.

14. A process for forming a film, which comprises: applying a coating fluid for forming a film on a substrate and curing said coating fluid at a temperature ranging from 40 to 70° C., wherein said coating fluid comprises
a polysiloxane (A) that consists essentially of the condensation polymerization product of a silicon compound of formula (1) as the essential component:

$$Si(OR^1)_4 \quad (1)$$

wherein $R^1$ is a $C_{1-5}$ hydrocarbon group, and
a compound (B) of the formula (2):

each of $R^2$, $R^3$, $R^4$ and $R^5$ which are independent of one another, is a hydrogen atom or a $C_{1-5}$ organic group, hydroxyethyl or hydroxypropyl.

* * * * *